US007397002B2

(12) United States Patent  (10) Patent No.: US 7,397,002 B2
Lagro  (45) Date of Patent: Jul. 8, 2008

(54) DEVICE AND METHOD FOR INSTALLATION OF ELECTRICAL WIRING IN CONDUIT

(75) Inventor: Phillip A. Lagro, Hawthorn Woods, IL (US)

(73) Assignee: Chaps Builders, Inc., Hawthorn Woods, IL (US)

( * ) Notice: Subject to any disclaimer, the term of this patent is extended or adjusted under 35 U.S.C. 154(b) by 0 days.

(21) Appl. No.: 10/226,834

(22) Filed: Aug. 23, 2002

(65) Prior Publication Data

US 2003/0037945 A1 Feb. 27, 2003

(51) Int. Cl.
H02G 3/04 (2006.01)
(52) U.S. Cl. .................. 174/481; 174/68.3; 174/47; 138/104
(58) Field of Classification Search .............. 174/48, 174/68.3, 68, 79, 47; 138/104, 103, 131, 138/134, 135, 137, 139, DIG. 8, 122; 254/134.4
See application file for complete search history.

(56) References Cited

U.S. PATENT DOCUMENTS

| 526,141 | A |  | 9/1894 | Bloomer |  |
|---|---|---|---|---|---|
| 979,899 | A |  | 12/1910 | Steigleder |  |
| 3,006,607 | A |  | 10/1961 | Hamrick |  |
| 3,052,451 | A |  | 9/1962 | Hamrick |  |
| 3,091,433 | A |  | 5/1963 | Riley, Jr |  |
| 3,119,600 | A |  | 1/1964 | Bitter |  |
| 3,244,403 | A |  | 4/1966 | Ensley |  |
| 3,899,005 | A | * | 8/1975 | Klimpl | 138/106 |
| 3,906,619 | A | * | 9/1975 | Shaffer | 29/517 |
| 3,927,866 | A | * | 12/1975 | Linquist | 254/134.4 |
| 4,334,121 | A | * | 6/1982 | Kutnyak | 174/68.3 |
| 4,335,647 | A | * | 6/1982 | Timmons | 454/300 |
| 4,966,202 | A | * | 10/1990 | Bryan et al. | 138/172 |
| 5,159,961 | A | * | 11/1992 | Snetting et al. | 141/10 |
| 5,197,605 | A | * | 3/1993 | Hampton | 206/582 |
| 5,240,228 | A | * | 8/1993 | Silveri | 254/134.4 |
| 5,259,418 | A | * | 11/1993 | Hamrick | 138/104 |
| 5,374,034 | A | * | 12/1994 | Flores et al. | 254/134.4 |
| 6,682,052 | B2 | * | 1/2004 | Griffioen et al. | 254/134.4 |

* cited by examiner

Primary Examiner—Dhiru R Patel
(74) Attorney, Agent, or Firm—McDermott Will & Emery LLP

(57) ABSTRACT

The disclosure is directed to a system for wiring conduit by use of an airflow-assisted pulling line and various components of the system. The system generally includes an airflow supply, a flexible pulling-line, a conduit-interface tube, and an airflow adapter for connecting the airflow supply with the wiring conduit. The adapter having a first end dimensioned to receive a conduit-interface tube and a second end adapted to receive an airflow source supply member. The preferred airflow supply is a conventional shop vacuum, but may be a blower rather than a vacuum source.

36 Claims, 2 Drawing Sheets

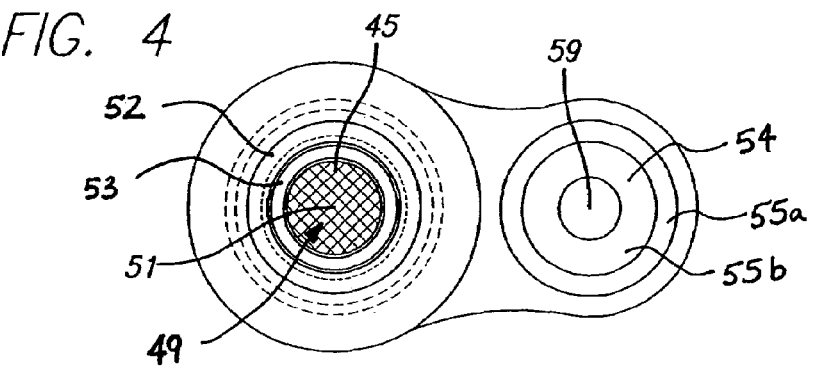
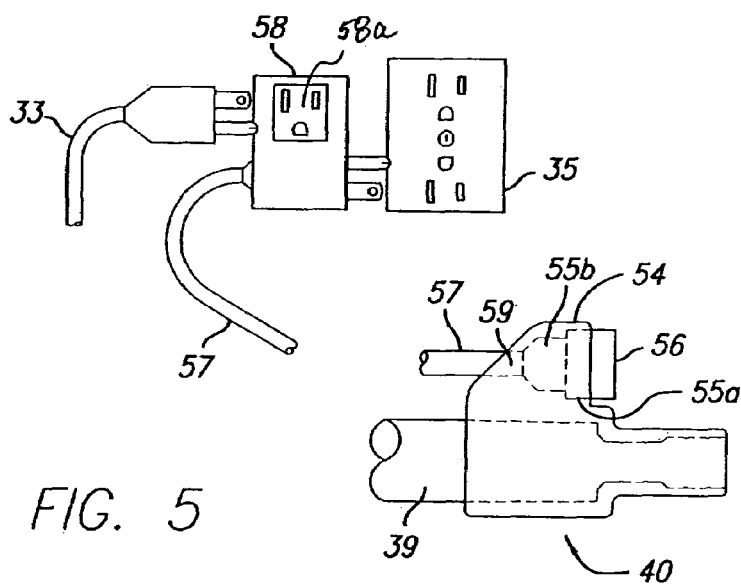
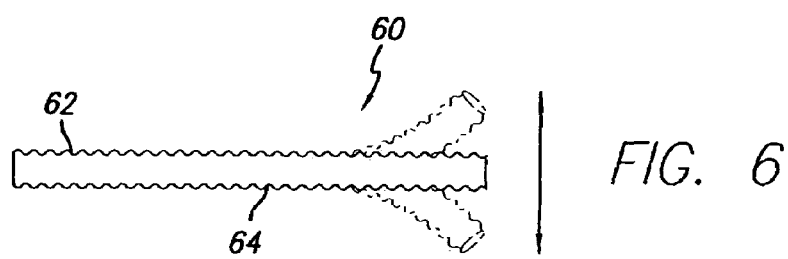
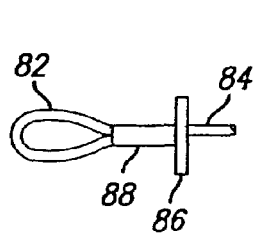
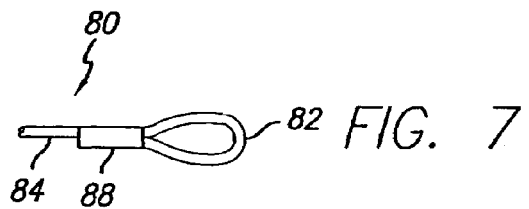

DEVICE AND METHOD FOR INSTALLATION OF ELECTRICAL WIRING IN CONDUIT

FIELD OF THE DISCLOSURE

The disclosure relates to a system for installing electrical wiring in conduits found in a variety of structures. More particularly, the disclosure includes an adapter and tubing for making efficient connections between the conduit and a vacuum source.

BACKGROUND OF THE DISCLOSURE

A common method for installing electrical wiring in residential, commercial and other structures, involves the placement of electrical wiring into electro-metallic tubing (EMT), otherwise commonly referred to as conduit. Conduit is rigid, hollow, bendable, thin-walled metal tubing, that is used to interconnect metal electrical boxes placed throughout the structure, forming a network used to convey electricity. Flexible conduit as well as plastic conduit and electrical boxes are also commercially available. Conduit is connected to itself and electrical boxes using a variety of specialized connectors and hardware, together forming a continuous pathway into which electrical wiring is placed for routing to all desired locations.

Conduit is widely used in electrical wiring applications. Two major benefits to the use of conduit for electrical wiring are safety and convenience. Since wires are completely enclosed within the conduit/electrical box network, electrical fires or other wiring related problems can be contained. From the standpoint of convenience, the conduit/electric box network provides a permanent, continuous pathway for routing electrical wiring to all locations, even in enclosed and inaccessible areas. Wiring may be introduced into or removed from conduit at any time, as electrical needs change or maintenance is required.

Conduit is manufactured in several tubing diameters, with ½ and ¾ inch diameters being typical and widely used. The choice of diameter to be used is made based on the quantity or size of wires to be installed. Within the overall network of conduit and electrical boxes, individual segments or lengths of conduit can vary considerably, based on the distance between electrical box connections. Lengths of conduit segments can range from a few feet up to 50 feet or more depending on requirements. Over shorter distances, depending on the quantity of wires to be installed, wires may simply be installed by pushing them into and through the conduit by hand. Greater distances, a larger quantity of wires, or other circumstances require equipment, instead of simply pushing, in order to move the wires through the conduit from one location to another. This may be due to any of several factors including lack of stiffness or rigidity exhibited by the wire(s), multiple bends in the conduit that may be encountered, and the overall resistance within the conduit due to friction.

The piece of equipment commonly used to install wires in conduit is called a fish tape. In its simplest Form the fish tape consists of a flexible, flattened, stiff steel wire (50 feet long is common), coiled into a reel-like housing which restrains it to prevent unintentional unwinding. The fish tape is payed out of and wound into the housing, by passing it through a slot that is slightly narrower than the width of the wire, creating an interference fit to prevent unintentional unwinding. The fish tape is introduced into and moved back and forth through the conduit to facilitate placement of wires. The tip of the fish tape is formed into a blunt, hook-like or eyelet shape, to ease its forward movement when pushed into and through the conduit away from the operator, and to facilitate attachment of wires for pulling them into and through the conduit toward the operator.

In normal use, the blunt, hook-like tip of the fish tape is introduced through the open front of an electrical box, and into the open end of a conduit segment where it is connected to the electrical box. The operator continues to withdraw the fish tape in short sections from within the fish tape housing, incrementally pushing it into the conduit, and advancing it gradually toward the opening at the opposite end of the conduit segment. This process continues until the necessary distance is traveled, and the hook-like tip of the fish tape emerges at the opposite end of the conduit segment and into the electrical box.

The operator then attaches the desired wires to the hook-like tip, so they may be pulled back into and through the conduit segment toward the electrical box at which the tip of the fish tape was originally inserted. The operator continues to pull the fish tape and attached wires back through the conduit a few feet at a time, incrementally rewinding the fish tape back into its housing. This process continues until the necessary distance is traveled, and the tip of the fish tape and wires emerge at the electrical box where originally inserted.

The fish tape and its method of use have several disadvantages as follows:

(1) The process of paying out and rewinding the fish tape into the fish tape housing is labor intensive and requires continuous, repeated motions by the operator. Continuous repeated motion operations have been associated with health care problems such as carpal tunnel syndrome.

(2) The fish tape can only be moved through a conduit segment in short increments, resulting in significant labor time spent installing wires in each conduit segment. On an overall project basis, labor cost for a specific work objective may be high, or less work accomplished in a given amount of time.

(3) The blunt, hook-like shape of the fish tape tip often makes it difficult to move through the conduit due to snagging on connections or other irregularities within the conduit segment. The fish tape may become stuck in the conduit segment, and may even be broken during a forceful retrieval attempt.

(4) Long conduit segments, especially those with many bends and direction changes, increase friction on and resistance to fish tape movement. This, combined with potential snagging or sticking within the conduit segment, can significantly add to the time and effort required, and affect job cost and efficiency.

(5) The fish tape, being itself a flattened metal wire, will conduct electricity, and could represent an electrical shock hazard to the operator or others under certain conditions.

Various attempts have been made to provide a vacuum system for installing wiring in conduits as described in U.S. Pat. Nos. 5,334,000, and including components for use in such systems as set forth in D246,823 and D312,336. To date, none of those systems has met with widespread commercial acceptance due to the cumbersome nature of their designs. The present disclosure addresses these problems.

SUMMARY OF THE DISCLOSURE

The disclosure is directed to a system for wiring conduit by use of an airflow-assisted pulling line. The system generally includes an airflow supply, a flexible pulling-line, a conduit-interface tube, and an airflow adapter for connecting the airflow supply with the wiring conduit. The adapter having a first end dimensioned to receive a conduit-interface tube and a second end adapted to receive an airflow source supply member. The preferred airflow supply is a conventional shop vacuum, but may be a blower rather than a vacuum source. The pulling-line can be either sucked through the conduit with a vacuum source or blown through it by use of a blower with sufficiently strong air current. When the air supply is a vacuum source, the adapter preferably has a retainer which is dimensioned to ensure that the pulling-line is retained within the adapter to prevent the pulling-line from entering the vacuum source.

In one embodiment of the disclosure, a novel adapter is provided for connecting a vacuum source to a wiring conduit opening at an electrical junction box including: (1) a first end dimensioned to receive an air source tubing; and (2) a second end dimensioned to receive a conduit interface tube for insertion into an electric conduit. The adapter preferably includes a pulling-line retainer to prevent a pulling-line from passing completely through the adapter and into a vacuum source.

In a still further embodiment of the disclosure, a flexible pulling-line for use in an airflow assisted wiring system is provided. The pulling-line has first and second looped ends adapted to receive a wire to be pulled through a conduit. Pulling-line has a moveable, repositionable retaining member dimensioned to contact the peripheral walls of the conduit to prevent the pulling-line from passing into the conduit when the pulling-line is inserted into the conduit via airflow. The preferred pulling-line is brightly colored, so that it is highly visible to the operator at all times during use. In use the pulling-line is drawn into the new device by the airflow created by the vacuum source. When the pulling-line is drawn into the molded body of the new device it first enters a transparent or translucent interface-tube, and then comes to rest against the pulling-line retainer portion of the device. The operator can see the brightly colored pulling-line within the substantially transparent or translucent interface-tube, and is thereby signaled to turn "off" the vacuum source. Both ends of the pulling-line are configured with a loop, to which a wire or group of wires may be attached in order to pull them back through a conduit segment. Between the looped ends of the pulling-line is provided a retainer washer, which serves as a positive stop in preventing the pulling-line from being inadvertently drawn into the conduit segment where it would be difficult to retrieve. The retainer washer is of a large enough diameter to prevent it from entering the conduit segment.

In another embodiment of the disclosure, a kit for use in vacuum source-assisted wiring is provided which includes an adapter having a first opening for attaching to the vacuum source and a second conduit interface-tube receiving opening, a pulling-line having looped ends and a moveable, repositionable retainer, and a conduit interface-tube for receipt in the conduit-interface opening. The kit preferably also includes a plurality of conduit interface-tubes having differing diameters. The kit may also include a set of color-coded tape markers or pulling-lines for marking conduit routing in a building.

In one preferred embodiment of the disclosure, an adapter is provided which provides a connection between the conduit opening at the electrical box and the vacuum source. The adapter is a molded body produced from a rigid or semi-rigid material and includes a vacuum-source receiving portion, a pulling-line retainer, a remote switching vacuum-source actuator, and a conduit interface-tubing receiving portion. Preferably, the vacuum-source receiving portion is configured with a slightly tapered cylindrical cavity, for accepting the male end of a standard shop-vacuum hose or tube ending. The larger diameter of the tapered cylindrical cavity is at the open end of the device's molded body, the diameter being slightly larger than the male end of the shop-vacuum hose for ease of insertion. The smaller diameter of the tapered cylindrical cavity is located within the device's molded body, the diameter being slightly smaller than the male end of the 1-¼" shop-vacuum hose for a secure fit and seal.

The preferred pulling-line retainer is a screen member which is inserted into the adapter opening and is lodged adjacent to a small diameter transitional segment of the cylindrical cavity of the vacuum-source adapter. It is further contemplated that the pulling-line retainer may also be formed by a mesh, grid, perforated plate or other physical barrier, which will readily allow the airflow to pass through toward the vacuum source, but would be comprised of openings smaller in diameter or cross-section than that of a looped end of the pulling-line being drawn through the conduit. The pulling-line retainer located in this portion of the device's molded body provides a physical barrier to prevent a pulling-line from being drawn into the shop-vacuum hose or the vacuum-source itself.

The remote switching actuator preferably controls a pneumatic to electric switch assembly into which the electrical cord of the air supply source is inserted. The actuator provides convenient on-off operation of the vacuum source when the operator is at too great a distance from the primary on-off control of the vacuum source. The actuator may be an air switch, electrical switch or other means of controlling the electrical power to the vacuum source.

In another aspect of the disclosure, a method for pre-placement of marker ribbons or pulling-lines at the time "rough" electrical work is completed, and before the hanging of drywall is provided. Once "rough" electrical work is completed (i.e. installation of conduit and electrical boxes), many municipalities will not allow wiring to be installed into conduit until hanging of drywall is completed. This is to prevent accidental penetration of conduit and wiring by drywall screws or nails, which could result in an electrical shock or other hazard. The method includes the steps of (1) pre-placement of nonconductive marker ribbons or pulling-lines prior to hanging drywall, (2) providing the marker ribbons or pulling-lines with indicia showing which wiring is to be installed in a particular conduit segment at a later time. The "finish" electrical crew would then simply follow the directional information or notations on the ribbons or flags, and (3) pulling the wires designated by the indicia through each conduit segment.

In another aspect of the disclosure, a method of determining conduit routing when concealed or enclosed within walls or structures including the steps of attaching an airflow source to a conduit opening; creating an airflow from an airflow source; connecting the airflow source with an electrical conduit; and probing other openings in the conduit for the presence of airflow.

BRIEF DESCRIPTION OF THE DRAWINGS

The organization and manner of the structure and function of the disclosure, together with the further objects and advantages thereof, may be understood by reference to the following description taken in connection with the accompanying drawings, wherein like reference numerals identify like elements, and in which:

FIG. 4 is a front end view of the adapter of the disclosure.

FIG. 5 is a fragmentary perspective view of the adapter of one embodiment of the disclosure including a pneumatic actuator and pneumatic electrical switch.

FIG. 6 is a plan view of a conduit interface-tube in accordance with the embodiment of the disclosure of FIG. 1 with flexing of the conduit interface-tube shown in phantom.

FIG. 7 is a fragmented view of the pulling-line of the embodiment of the disclosure shown in FIG. 1.

DETAILED DESCRIPTION OF THE DRAWINGS

Figure 1:
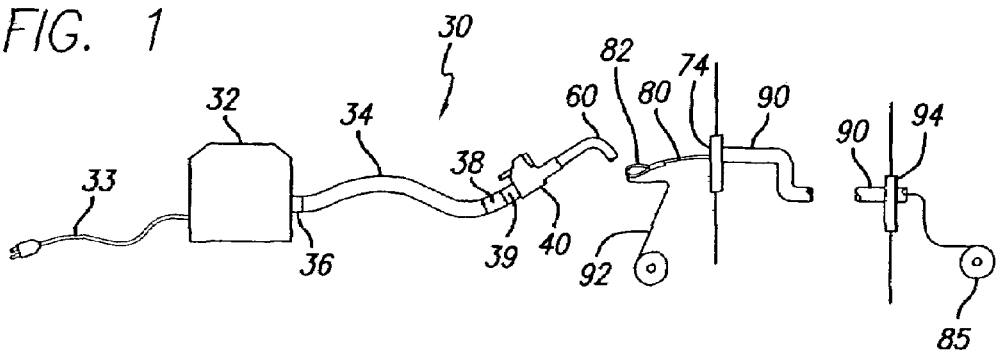
FIG. 1 is a perspective view of one embodiment of the airflow assisted wiring system of the disclosure showing the conduit in a schematic representation.

FIGS. 1-7 illustrate an embodiment of the airflow wiring system of the present disclosure. The wiring system 30 generally includes a vacuum source 32, adapter 40, conduit interface-tube 60 and pulling-line 80. The vacuum source 32 creates an airflow in a conduit segment of an electrical system in a structure. The vacuum source 32 is connected to one end of the conduit 90 at electric box 74 while the opposite end of the conduit 90 remains open to the atmosphere. The resulting flow of air toward the vacuum source is strong enough, that it will quickly and easily carry the lightweight, flexible pulling-line 80 toward the vacuum source 32, thereby positioning the pulling-line 80 from end-to-end within the conduit segment 90. The end of the pulling-line 80 that emerges from the conduit 90 adjacent the vacuum source 32 is then connected to the wires 92 to be installed in that conduit segment 90. Thereafter, simply pulling on the opposite end of the pulling-line 80 draws the wires 92 into and through the conduit 90, until they emerge into the electrical box 94 at the opposite end where the pulling-line 80 was originally introduced.

Turning to FIGS. 1, 2, 5 and 7 the vacuum source 32 is preferably a conventional shop-vacuum with a standard intake hose 34, typically having a 1.25 inch outer diameter, which has a first end 36 attached to the vacuum source 32 and second end 38 preferably including a rigid or semi-rigid tube member 39. As best seen in FIGS. 1-4, the second end 38 of the hose 34 is received by a first end 41 of the adapter 40. The second end of hose 38 is preferably retained by friction fit between tube member 39 and the airflow connecting segment 42 on first end 41 of adapter 40. Cylindrical wall 43 and its radially inwardly extending interior surface 28 define airflow connecting segment 42. The interior surface 28 of the cylindrical walls 43 define an airflow connecting cavity within the airflow connecting segment 42. The internal diameter of cylindrical walls 43 and thereby airflow connecting segment 42 taper from being slightly larger than the external diameter of tube 39 to slightly smaller than its external diameter to provide a friction fit for the tube 39 within wall 43. While it is preferred that the tube 39 is received within the passageway 45 as shown in FIG. 1, it is also contemplated that cylindrical wall 43 may extend outwardly from the front of the adapter body and be dimensioned to mate with tube 39 as a male member, rather than as a female member as shown in FIGS. 1-5.

Figure 2:
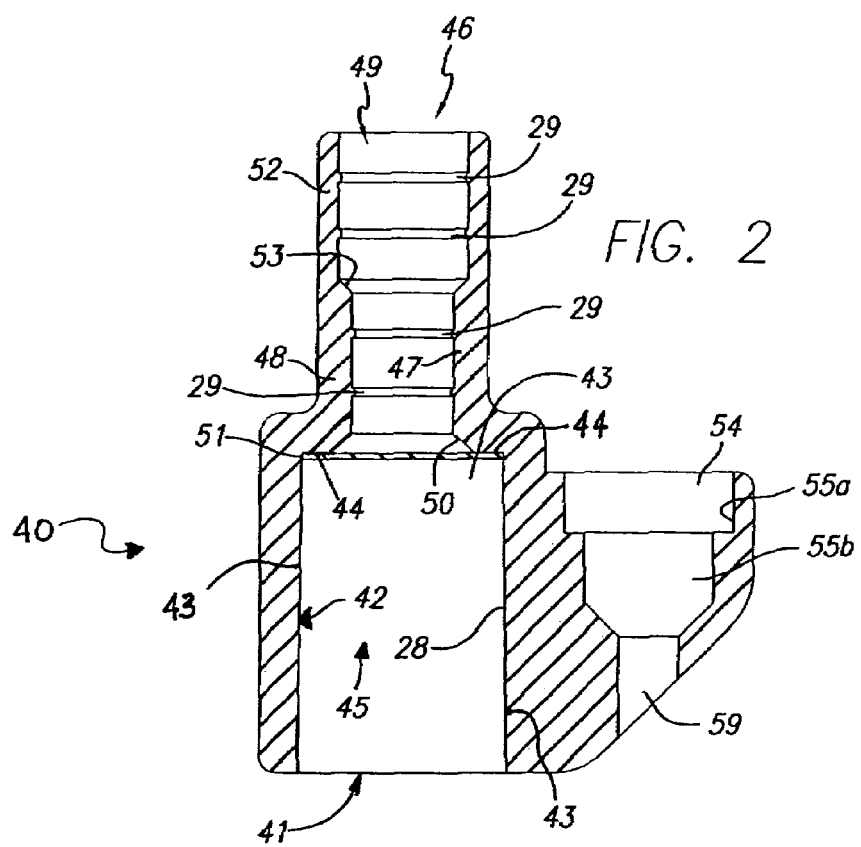
FIG. 2 is a top cross-sectional view of the adapter of the disclosure.
Figure 3:
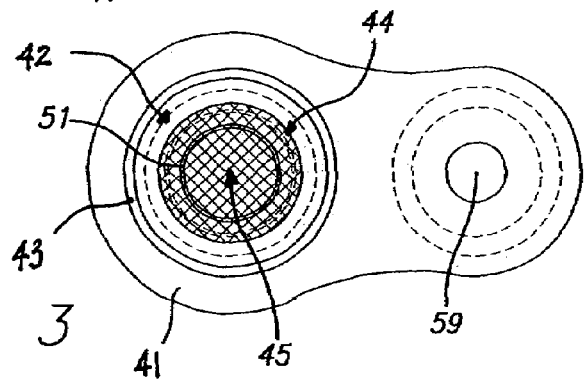
FIG. 3 is a back end view of the adapter of the disclosure.

The adapter 40 has an air passageway 45 extending through adapter 40 from first end 41 through airflow connecting segment 42, transition segment 47, conduit interface-tube connecting segment 49, and second end 46. Air passageway 45 is formed by three primary segments of differing internal diameter, that is, airflow connecting segment 42, transition segment 47, and first conduit interface-tube connecting segment 49. The transition segment 47 is defined by cylindrical transition wall section 48 which has a smaller internal diameter than cylindrical wall 52. Both the transitional segment 47 and interface connecting segment 49 are provided with ribs 29 extending inwardly from the inner surface of cylindrical walls 48 and 52, respectively. Transition wall section 48 is joined to end wall 44 of airflow connecting segment by annular angled surface 50. A pull line retainer 51 extends between opposing surfaces of annular angled surface 50. Pull line retainer 51 and angled annular surface 50 are dimensioned and positioned to prevent looped end 82 of pulling-line 80 from passing by the retainer 51 thereby providing a barrier to entry of the pulling-line 80 into hose 34 of vacuum source 32 during operation. As best seen in FIGS. 2-4, the preferred pull line retainer 51 is a mesh screen having an outer diameter slightly larger than the minimum internal diameter of the cylindrical wall 43. Although a mesh screen is preferred, other air permeable insertable barriers may be used, such as a grid, perforated disk, or air permeable barrier molded into the adapter which will readily allow airflows to pass through toward the vacuum source, but has no opening large enough to allow passage of the loop 82 of the pulling-line 80. Pulling-line 80 may be collected on a spool 85 as shown in FIG. 1.

Conduit interface-tube connecting segment 49 is located on second end 46 of adapter 40 and is defined by cylindrical wall section 52 and angled stop surface 53. Conduit interface-tube connecting segment 49 is sized and dimensioned for receipt of conduit interface-tube 60. Also, transitional segment 47 is preferably dimensioned for receipt of and to retain a conduit interface tube having a smaller diameter than conduit interface tube 60. Thus, the interior diameter of the conduit interface-tube connecting segment 49 and transitional segment are preferably selected to be slightly larger than the exterior diameter of standard conduit sizes, for example, ¾ of an inch for the tube connecting segment and about ½ inch for the transitional segment. Accordingly, the portion of the adapter defined by walls 48 and 52 provide a preferred conduit interface channel for receipt of different sized conduit interface tubes. Further, the external diameter of interface tube connecting segment is preferably selected to be about 1 inch so that a 1 inch conduit interface tube will receive the segment 49 as a male portion in a mating relationship. In accordance with this preferred embodiment, a single adapter can accommodate conduit interface tubes of ½, ¾ and 1 inch, respectively. As shown in the preferred embodiment of FIGS. 1-5, the cylindrical wall sections 52 are parallel, however it is contemplated that slightly tapered or stepped sided walls may also be used to define the conduit interface-tube connecting segment. The conduit interface-tube 60 is preferably detachable so that the adapter can accommodate tubing of different diameters. However, it is contemplated that conduit interface-tube 60 may be permanently affixed to adapter 40 by means of an adhesive, melt weld, etc. Stop surface 53 prevents excessive insertion of conduit interface-tubes having certain dimensions.

Adapter 40 is also provided with an actuator-switch receiving cavity 54 having a first portion 55a for receipt of actuator 56, a second reduced diameter cavity 55b, and an opening 59 for accommodating a cord or tube 57 linking the actuator 56 to a switch unit 58. As shown in FIG. 5, the preferred actuator is an air-bellows linked by a tube 57 to a pneumatic electrical switch unit 58. The actuator 56 provides the operator with the ability to turn the vacuum source "off" and "on" from a remote location. As shown in FIG. 5, the electrical cord 33 of the vacuum source 32 is plugged into a receptacle 58a of the switch unit 58 and the switch unit 58 is plugged into an electrical receptor or power source 35.

Turning to FIG. 6, it can be seen that conduit interface-tube 60 is corrugated along its entire length, making it flexible and bendable as shown in phantom. The corrugations being formed by a plurality of alternating ridges and valleys. Alternately, the corrugations may not extend along the entire length of the interface tube (not shown). The corrugations contribute to the tube being noncollapsible, so that it can maintain an essentially uniform internal diameter even upon flexing and bending. The flexible, corrugated conduit interface-tube 60 can be adapted to the many positions and orientations of conduit connector openings within an electrical box. The interface-tube 60 is sized and dimensioned to be inserted into and to substantially sealingly engage tube-receiving segment 49 of the second end 46 of the adaptor 40. A first end 62 of the interface tube 60 is sized and dimensioned for insertion into tube connecting segment 49 of the second end 46 of the adapter 40. A second end of the interface-tube 60 is preferably sized and dimensioned such that it has an outside diameter that is slightly smaller than the inside diameter of the conduit opening into which it is inserted. Upon insertion of the interface-tube 60 into the opening of the conduit and activation of the vacuum source 32, the close fit between the two ensures that there is minimal air leakage at the insertion point, so that sufficient airflow is generated in the conduit 90 to propel the pulling-line 80. It is also contemplated that the interface tube could be dimensioned so that the inside diameter of the interface tube would be slightly larger than the outside diameter of the electrical conduit. The preferred conduit interface-tube is made of a thermoplastic resin with a Shore A durometer of about 50 and is at least partially transparent or translucent so that passage of the pulling-line into the conduit interface-tube 60 may be observed. The resin should be flexible and durable enough that the corrugated interface-tube can be bent into angles between zero and ninety degrees or greater.

It is contemplated that the system of the disclosure may be utilized with conduit having differing diameters. Accordingly, a plurality of conduit interface-tubes having differing external diameters which are slightly smaller than the internal diameter of standard conduit connectors may be provided with the system of the disclosure. Although the preferred conduit interface-tube 60 has a corrugated portion 64 for bending, it is contemplated that substantially rigid central portion may be substituted. In such an embodiment of the disclosure, a series of angled attachments would be provided to accommodate insertion into conduit connectors found in electrical boxes having differing geometry and orientation. Typically, such attachments would be either corrugated and bendable to any angle or fixed at angles of 30, 45 60, and 90 degrees.

Referring to FIG. 7, pulling-line 80 includes a loop 82 on each end, an intermediate portion 84, and retaining member 86 moveably and repositionably located along the linear portion 84 of the pulling-line 80. The loop 82 is adapted to receive an electrical wire 92 for pulling through the conduit. The loop is preferably formed by creating a melt weld 88 of the line upon itself, although it is contemplated that other securing members may be used such as an adhesive tape, a suitable adhesive, or a crimped light-weight metal band. The pulling-line 80 is preferably made of a brightly-colored, woven material having threads or yarns of contrasting colors such as red and yellow. The preferred materials are light weight, flexible synthetic compounds such as nylon, polyester or polypropylene. The use of the brightly-colored material provides a visual signal to the operator that the pulling-line has passed through the conduit interface-tube 60 and entered the adapter 40. The wire 92 is preferably wrapped around the loop 82 and may be secured to the loop with electrical tape.

When using the system of the disclosure, the process of paying out the pulling-line 80 is simple and effortless. One end of the pulling-line 80 is simply introduced into the vacuum-created airflow at a desired conduit connector opening, and is drawn along by the airflow in the conduit 90 toward its opposite end. The pulling-line 80 easily follows the flow of air around conduit bends and direction changes with virtually no frictional resistance. The time and effort required to slowly pay out a stiff metal fish tape from its housing, push it along incrementally through the conduit and then rewind it into its housing is eliminated. Pulling wires back through conduit using the flexible pulling-line is easy, and since it does not have the blunt, hook-like shape of the fish tape tip, it does not get caught, snagged or stuck as it moves through the conduit. The nonmetallic pulling-line does not conduct electricity. The efficiency of the new device can increase productivity and reduce project costs.

In accordance with another aspect of the disclosure, a novel method of wiring a building is provided. The method involves pre-placement of markers at the time "rough" electrical work is completed, and before the hanging of drywall. Once "rough" electrical work is completed (i.e. installation of conduit and electrical boxes), many municipalities will not allow wiring to be installed into conduit until hanging of drywall is completed. This is to prevent accidental penetration of conduit and wiring by drywall screws or nails, which could result in an electrical shock or other hazard. The new method allows the pre-placement of a nonconductive marker, which may be, for example, ribbons, tapes or pulling-lines prior to hanging drywall in the same manner described above for the pulling-line 80. The marker may have a surface that can be written on or may be flagged by tying or affixing a suitable material to the marker to provide indicia showing which wiring is to be installed in a particular conduit segment at a later time. Alternately, the indicia may be color coding in which certain colors of marker are indicative of the type and number of wires to be installed in a conduit segment. The "finish" electrical crew would then simply follow the color code, directional information or notations on the indicia, and pull the designated wires through each conduit segment with no further need for wire pulling equipment.

In accordance with a further aspect of the disclosure, a novel method of determining conduit routing within enclosed walls or other inaccessible spaces is provided. The method is useful since once "rough" electrical work is completed, and prior to hanging of drywall, it is easy to see exactly where conduit segments are located and which electrical boxes they are interconnecting. However, once drywall has been hung and conduit is enclosed or inaccessible, it is no longer possible to observe where conduit segments are located and which electrical boxes they interconnect. This is true for new electrical installations as well as pre-existing situations. Using the new device, however, conduit segment routing can easily be determined. For any given conduit opening at an electrical box, attaching the interface-tubing of the new device and creating a vacuum-produced or blower induced airflow, will immediately allow the operator to determine the opposite end of that conduit segment. It will be found by identifying the only conduit opening having an inward flow of air (or outward airflow if a blower, rather than a vacuum, is used). This can work whether or not there are already wires in the conduit segment, by using an appropriately sized and shaped adapter tip on the end of the interface-tubing. In this way, as few as a single connection can be traced or when serially repeated an entire conduit interconnection map can be generated.

Where a large number of interconnections are to be mapped, elongated, color coded markers can be used to provide a visual reminder of routing. The marker can be introduced into the conduit segment in the same manner as set forth above for the pre-placement of markers.

The applicant has provided description and figures which are intended as an illustration of certain embodiments of the disclosure, and are not intended to be construed as containing or implying limitation of the disclosure to those embodiments. It will be appreciated that, although applicant has described various aspects of the disclosure with respect to specific embodiments, various alternatives and modifications will be apparent from the present disclosure which are within the spirit and scope of the present disclosure as set forth in the following claims.

The invention claimed is:

1. A system for installing electrical wiring into electrical conduit, the system comprising:
   a vacuum source having a hose;
   a conduit interface tube;
   a lightweight pulling line that is drawable through the electrical conduit by the vacuum source;
   an integral, one-piece adapter having a first connector segment extending inward from a first end of the adapter wherein the first connector segment receives an extent of the hose, the adapter further having a second connector segment extending inward from a second end of the adapter wherein the second connector segment receives an extent of the interface tube, the adaptor further having a transition segment positioned between the first and second connector segments, the transition segment having a diameter less than a diameter of both the first and second connector segments;
   wherein the first and second connector segments and the transition segment collectively define an internal air passageway that extends between the first and second ends of the adaptor; and,
   wherein the hose extends between the vacuum source and the first connector segment of the adapter, and wherein the interface tube extends between the second connector segment and the electrical conduit through which the electrical wire is introduced.

2. The system of claim 1, wherein the adaptor has a switch housing positioned radially outward of the air passageway, wherein the housing does not intersect the air passageway and wherein the housing defines a cavity that receives an actuator for remote operation of the vacuum source.

3. The system of claim 2, further comprising a remote switching unit that provides for remote operation of the vacuum source, the remote switching unit having at least one receptacle that receives a plug of the vacuum source, the remote switching unit further having a plug for electrical connection of the vacuum source to a power source.

4. The system of claim 3, wherein a cord extends between the actuator and the remote switching unit.

5. The system of claim 1, wherein the adaptor has a screen barrier positioned within the air passageway between the first connector segment and the transition segment.

6. The system of claim 5, wherein the internal air passageway has a staggered portion between the first connector segment and the transition segment, the screen barrier being positioned against the staggered portion.

7. The system of claim 1, wherein the first connector segment has an inward taper whereby an inward portion of the connector segment has a diameter that is less than a diameter of an outer portion of the connector segment.

8. The system of claim 1, wherein the transition segment has a first end with an angled wall leading to the first connector segment.

9. The system of claim 8, wherein the transition segment has a second end with an angled wall leading to the second connector segment.

10. A vacuum system for installing electrical wiring into electrical conduit, the vacuum system having remote operation capabilities, the vacuum system comprising:
    a vacuum source having a hose; a conduit interface tube;
    a lightweight pulling line that is drawn through the electrical conduit by suction provided by the vacuum source;
    an integral, one-piece adapter having a first connector segment extending inward from a first end of the adapter wherein the first connector segment receives an extent of the hose, the adapter further having a second connector segment extending inward from a second end of the adapter wherein the second connector segment receives an extent of the interface tube, wherein a longitudinal axis of the first connector segment is aligned with a longitudinal axis of the second connector segment, the adaptor further having an auxiliary cavity positioned radially outward of the first and second connector segments; and wherein the cavity is misaligned with the longitudinal axis of the first and second connector segments; an actuator positioned within the auxiliary cavity of the adapter; and a remote unit with at least one receptacle that receives an electrical plug of the vacuum source, the remote unit further having an electrical plug for connection of the vacuum source to a power source.

11. The vacuum system of claim 10, wherein the cavity has a first portion and a second portion, and wherein a diameter of the first portion exceeds a diameter of the second portion.

12. The vacuum system of claim 10, further comprising a cord extending between the remote unit and the actuator, wherein the cord transmits operational signals between the actuator and the vacuum source.

13. The vacuum system of claim 12, wherein the auxiliary cavity has an opening that receives the cord extending between the remote unit and the actuator.

14. The vacuum system of claim 10, wherein the actuator is a pneumatic actuator.

15. The vacuum system of claim 10, wherein the actuator is an electrical actuator.

16. The vacuum system of claim 10, wherein the adaptor has an integral one-piece construction.

17. The vacuum system of claim 10, wherein the adaptor has a transition segment positioned between the first and second connector segments, the transition segment having a diameter less than a diameter of both the first and second connector segments.

18. The system of claim 17, wherein the transition segment has both a first end with an angled wall leading to the first connector segment and a second end with an angled wall leading to the second connector segment.

19. A vacuum system for installing electrical wiring into electrical conduit, the vacuum system having remote operation capabilities, the vacuum system comprising:
    a vacuum source having a hose;
    a conduit interface tube;
    a lightweight pulling line that is drawn through the electrical conduit by suction provided by the vacuum source;
    an adapter having a first end opening and an opposed second end opening, the first end opening having a first connector segment extending inward that receives the hose, the second end opening having a second connector segment extending inward that receives the interface tube, the adaptor further having a barrier screen positioned between the inward end of each of the first and second connector segments, the adaptor further having an auxiliary housing positioned radially outward of the first and second connector segments;

wherein the first and second connector segments are substantially aligned to define an internal air passageway that extends between the first and second end openings, and wherein the auxiliary housing does not intersect the internal air passageway; and, wherein the second connector segment has a length defined from the second end opening to the barrier screen, and wherein the second connector segment has an outer diameter that is less than an inner diameter of the first connector segment.

20. The vacuum system of claim 19, further comprising a switch assembly adapted to provide remote operation of the vacuum source, the switch assembly having a switch positioned within the auxiliary housing of the adapter, the switch assembly further having a remote unit with at least one receptacle that receives a plug of the vacuum source, the remote unit further having a plug for electrical connection of the vacuum source to a power source.

21. The vacuum system of claim 20, wherein the switch assembly further comprises a cord extending between the remote unit and the switch, wherein the cord transmits on and off operational signals between the switch and the vacuum source.

22. The vacuum system of claim 20, wherein the switch is a pneumatic switch.

23. The vacuum system of claim 20, wherein the switch is an electrical switch.

24. The vacuum system of claim 19, wherein the second connector segment has a transition segment extending to the barrier screen, the transition segment having a diameter less than a diameter of both the first and second connector segments.

25. The vacuum system of claim 24, wherein the transition segment has a first end with an angled wall leading to the barrier screen.

26. The vacuum system of claim 25, wherein the transition segment has a second end with an angled wall leading to the second connector segment.

27. A vacuum system for installing electrical wiring into electrical conduit, the system comprising:
   a vacuum source having a hose;
   a conduit interface tube;
   a lightweight pulling line that is drawable through the electrical conduit by the vacuum source;
   an adapter having a first connector segment extending inward from a first end of the adapter wherein the first connector segment has a tapered internal wall arrangement, the adapter further having a second connector segment extending inward from a second end of the adapter, the second connector segment having an inner surface with at least one internal circumferential rib that engages an outer surface of the interface tube received within the connector segment;

wherein the first and second connector segments collectively define an internal air passageway that extends between the first and second ends of the adaptor; and, wherein the hose extends between the vacuum source and the first connector segment of the adapter, and wherein the interface tube extends between the second connector segment and the electrical conduit through which the electrical wire is introduced.

28. The vacuum system of claim 27, wherein the adaptor has a transition segment positioned between the first and second connector segments, the transition segment having a diameter less than a diameter of both the first and second connector segments.

29. The vacuum system of claim 28, wherein the transition segment has a first end with an angled wall leading to the first connector segment.

30. The vacuum system of claim 29, wherein the transition segment has a second end with an angled wall leading to the second connector segment.

31. The vacuum system of claim 27, wherein the adaptor has a switch housing positioned radially outward of the air passageway wherein the housing defines a cavity that receives an actuator for remote operation of the vacuum source.

32. The vacuum system of claim 31, further comprising a remote switching unit that provides for remote operation of the vacuum source, the remote switching unit having at least one receptacle that receives a plug of the vacuum source, the remote switching unit further having a plug for electrical connection of the vacuum source to a power source.

33. The vacuum system of claim 32, wherein a cord extends between the actuator and the remote switching unit.

34. The vacuum system of claim 27, wherein the adaptor has a screen barrier positioned within the air passageway between the first connector segment and the second connector segment.

35. The vacuum system of claim 34, wherein the internal air passageway has a staggered portion between the first and second connector segments, the screen barrier being positioned against the staggered portion.

36. The vacuum system of claim 27, wherein the at least one internal circumferential rib produces an audible indicia that the interface tube is fully inserted into the second connector.

* * * * *